(12) United States Patent
Sørstrøm

(10) Patent No.: US 9,267,256 B2
(45) Date of Patent: Feb. 23, 2016

(54) OIL BOOM SKIMMER APPARATUS

(75) Inventor: Stein Erik Sørstrøm, Trondheim (NO)

(73) Assignee: SINVENT AS, Trondheim (NO)

( * ) Notice: Subject to any disclaimer, the term of this patent is extended or adjusted under 35 U.S.C. 154(b) by 398 days.

(21) Appl. No.: 13/805,389

(22) PCT Filed: Jun. 29, 2011

(86) PCT No.: PCT/NO2011/000188
§ 371 (c)(1),
(2), (4) Date: Feb. 28, 2013

(87) PCT Pub. No.: WO2012/002821
PCT Pub. Date: Jan. 5, 2012

(65) Prior Publication Data
US 2013/0153476 A1    Jun. 20, 2013

(30) Foreign Application Priority Data

Jun. 29, 2010  (NO) .................................. 20100943

(51) Int. Cl.
*E02B 15/10* (2006.01)
*E02B 15/06* (2006.01)
*E02B 15/08* (2006.01)

(52) U.S. Cl.
CPC ................. *E02B 15/10* (2013.01); *E02B 15/06* (2013.01); *E02B 15/08* (2013.01); *E02B 15/103* (2013.01); *E02B 15/0814* (2013.01); *E02B 15/0842* (2013.01)

(58) Field of Classification Search
CPC ..... E02B 15/06; E02B 15/08; E02B 15/0814; E02B 15/0842; E02B 15/085; E02B 15/10; E02B 15/103; E02B 15/105
USPC ................... 210/170.05, 170.11, 242.3, 923; 405/63, 70
See application file for complete search history.

(56) References Cited

U.S. PATENT DOCUMENTS

| | | | | |
|---|---|---|---|---|
| 3,221,884 A | * | 12/1965 | Muller | ....................... 210/242.3 |
| 3,618,768 A | | 11/1971 | Brown | |
| 3,666,098 A | | 5/1972 | Garland et al. | |
| 3,847,816 A | * | 11/1974 | DiPerna | ..................... 210/242.3 |

(Continued)

FOREIGN PATENT DOCUMENTS

| WO | 97/10388 | 3/1997 |
|---|---|---|
| WO | 2004/025034 | 3/2004 |
| WO | 2004/040067 | 5/2004 |

OTHER PUBLICATIONS

International Search Report issued Sep. 26, 2011 in corresponding International Application No. PCT/NO2011/000188.

(Continued)

*Primary Examiner* — Christopher Upton
(74) *Attorney, Agent, or Firm* — Wenderoth, Lind & Ponack, L.L.P.

(57) ABSTRACT

An oil boom skimmer member for oil spill recovery, in particular for collecting oil from a water surface, has a skimmer arrangement integrated into an oil boom member. An oil recovery system, in particular for collecting oil from a water surface, includes a plurality of such oil boom skimmer members connected in series to form an oil spill recovery boom apparatus. A guiding boom is connected to each of the outermost oil boom members, and the guiding booms are also connected to a vessel for operating the system. Through the use of trawl technology the skimmer oil boom apparatus can be operated by only one vessel when needed.

19 Claims, 6 Drawing Sheets

(56) References Cited

U.S. PATENT DOCUMENTS

| | | | |
|---|---|---|---|
| 4,356,089 A * | 10/1982 | Challener et al. | 210/242.4 |
| 4,432,874 A * | 2/1984 | Lundin | 405/63 |
| 5,169,526 A * | 12/1992 | Gould | 210/242.3 |
| 5,423,985 A * | 6/1995 | Addeo et al. | 210/242.4 |
| 7,297,259 B2 * | 11/2007 | Zori Garcia | 210/242.3 |
| 2003/0062297 A1 | 4/2003 | Rosquist | |

OTHER PUBLICATIONS

Norwegian Search Report issued Jan. 29, 2011 in corresponding Norwegian Application No. 20100943.

* cited by examiner

Fig. 1 - PRIOR ART

OIL BOOM SKIMMER APPARATUS

INTRODUCTION

The present invention relates to an oil collection boom apparatus. In particular, the invention relates to an oil boom skimmer member of an oil spill recovery boom apparatus for use in offshore oil spill protection, as well as an oil spill recovery boom apparatus comprising a number of such oil boom skimmer members.

BACKGROUND

The prior art mechanical oil spill protection equipment consists basically of two main components;
An oil boom arrangement used for confining the oil floating on the water surface.
A skimmer used for separating the oil from the water and for pumping the oil to a collecting vessel through a flexible tube.

In an ordinary emergency situation, the oil boom arrangement is operated by two vessels (one at each end of the oil boom arrangement) while the skimmer is operated by a third vessel. In some cases, the skimmer can be operated from one of the oil boom vessels.

A challenge with this configuration, among other things, is to position the skimmer in the part of the oil boom in which the most of the oil (thickest oil slicks) is located while at the same time the oil boom vessels maneuver the oil boom together with the skimmer and against the direction of flow. This is shown in FIG. 1.

Moreover, it is always a challenge to ensure an adequate flow of oil into the pump housing of the skimmer, in particular in situations with poor weather.

Examples of prior art solutions for mechanical oil spill protection are found, for example, in U.S. Pat No. 3,666,098, WO 2004/025034, and WO 97/10388.

SUMMARY OF THE INVENTION

The present invention provides a solution to the problems set out above.

In a first aspect, the invention provides an oil boom skimmer member for oil spill protection, in particular for collecting oil from a water surface, wherein the oil boom skimmer member comprises a brush skimmer arrangement integrated into an oil boom member.

The brush skimmer arrangement may include at least one rotating brush device for collecting the oil from the water surface and for transporting the oil into the oil boom skimmer member. The brush device may be an elongate brush skimmer arranged in parallel with a longitudinal axis of the oil boom skimmer member. The brush device may be eccentrically positioned relative to a longitudinal center axis of the oil boom skimmer member in order to achieve a satisfactory contact with the oil on the water surface.

The oil boom skimmer member may further include a means for removing collected oil from the brush device. The means for removing collected oil may be constituted by an axial screw pump. In addition, the oil boom skimmer member may include a pump for pumping the collected oil through a tube of the oil boom skimmer member to an external collecting tank for the oil. At least one motor may be integrated into the oil boom skimmer member for operating/powering the brush skimmer and/or pump. At least one flotation member may be configured in such a manner that the brush device is positioned in a surface position. The oil boom skimmer member may further include a connector means for connecting the oil boom skimmer member to at least one adjacent oil boom skimmer member or guiding boom. The oil boom skimmer member may also include at least an integrated signal cable, hydraulic pipe, and oil return tube, with the connector means including a quick release coupling for connecting to a corresponding one of the at least one signal cable, hydraulic pipe, and oil return tube of an adjacent oil boom skimmer member or guiding boom. A skirt may be provided suspending underneath the oil boom skimmer member, and be connectable to the skirt of an adjacent oil boom skimmer member or guiding boom.

In a second aspect, the invention provides an oil recovery boom apparatus comprising a number of oil boom skimmer members as set out above connected in series, and guiding booms connected to the outermost ones of the number of oil boom skimmer members. The guiding booms may further include a flexible tube arranged inside the guiding boom for transporting collected oil and water to an external collecting tank. The guiding booms may also include a power supply for the oil boom skimmer members, with the power supply being arranged on the inside of the guiding booms. Each of the guiding booms may further include a connector means for connection to the adjacent oil boom skimmer member. A wireline may be connected to each guiding boom, with each wireline being attached to a towing vessel. The wireline may further include a tube for collected oil, hydraulic cable, power supply, and signal cable. A trawl door may be connected to each wireline.

In a third aspect, the invention provides an oil spill protection system, in particular for collecting oil from a water surface, comprising a plurality of oil boom skimmer members as set forth above connected in series, a guiding boom connected to each of the outermost ones of the plurality of oil boom elements, with the guiding booms also being connected to a vessel for operating the system. The guiding booms may be connected to the vessel by way of wireline and trawl doors.

The present invention provides a novel oil spill protection concept in which the skimmer and oil boom are integrated into the same assembly.

By integrating the skimmer members into the oil boom itself a significantly improved contact surface is achieved between the brushes of the skimmer and the oil to be collected as compared to the current solutions. At the same time, the problems associated with having two operate several vessels simultaneously are avoided. Through the use of trawl technology, the skimmer oil boom apparatus of the present invention can be operated by only one vessel when needed. Also, using this concept, the need for repeatedly positioning and repositioning the skimmer inside the oil slick confined by the oil boom is avoided.

The concept will be well suited for use in open sea where the operation itself is normally a challenge, but will also be suitable in areas which are partially covered with ice and in coastal areas where it may often be difficult to maneuver more than one vessel at a time.

BRIEF DESCRIPTION OF THE DRAWINGS

In the following, the invention will be explained in more detail with reference to various exemplary embodiments illustrated in the drawings, in which.

DETAILED DESCRIPTION

According to the present invention, the skimmer function is integrated into the oil boom so that all the skimmer components are embedded into the oil boom.

Figure 1:
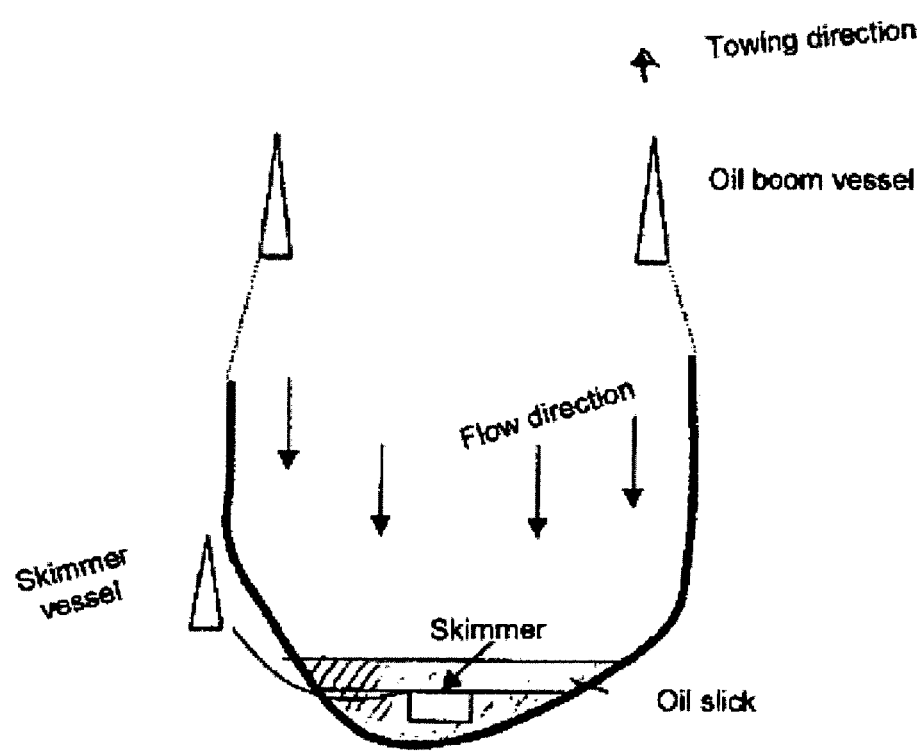
FIG. 1 shows a prior art oil recovery boom and the operation thereof through the use of several vessels in accordance with the prior art.
Figure 2:
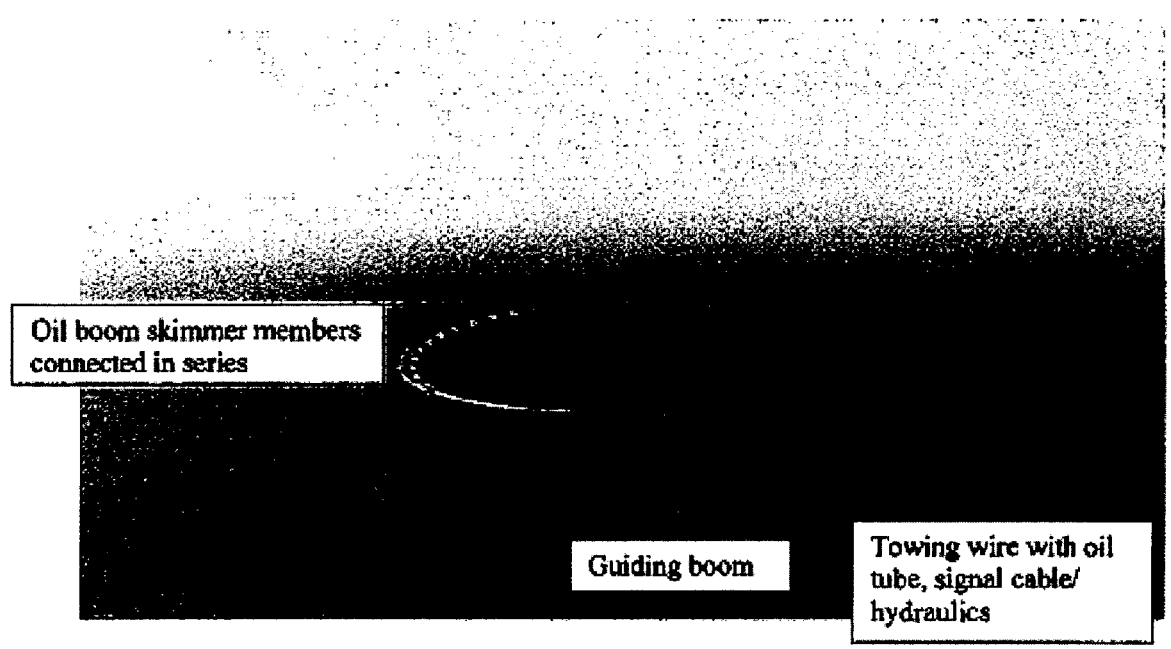
FIG. 2 shows an oil boom skimmer apparatus deployed on the sea for collecting oil according to an embodiment of the present invention.

FIG. 2 shows an example of a combined oil boom and skimmer for use in offshore oil spill recovery according to the invention. The oil boom and oil skimmer are combined into one assembly, i.e. to an oil boom skimmer member. The oil boom skimmer apparatus of FIG. 2 is made of a number of oil boom skimmer members forming the lower end of the oil boom at which the oil will be picked up from the sea surface. The oil boom skimmer members are connected in series by way of connector assemblies between each oil boom skimmer member, so as to form a continuous chain. To the outermost oil boom skimmer member on each side of the chain, an ordinary guiding boom is mounted into which a hydraulic power supply, signal control cables, and an oil emulsion tube may also be integrated, or is integrated. A towline provided with a flexible oil tube and signal cable/hydraulics is connected to each guiding boom. The towline comprising tubes/cables/hydraulics is attached onboard a towing vessel. The skimmer oil boom may be operated by one vessel through the use of trawl technology for operating the skimmer oil boom apparatus. Trawl doors can be connected at the end of the guiding booms whenever necessary to help keeping the oil boom open so that the skimmer oil boom apparatus can be operated by only one vessel. The vessel will then be able to tow the skimmer oil boom apparatus behind it in order to position the apparatus the best way possible in terms of collecting the oil.

The skimmer oil boom apparatus as well as the guiding boom may have "skirts" mounted thereon suspended under the surface part of the oil boom and making sure the oil does not dive under the oil boom to escape behind it. The skirt may contain tubes for supplying air and/or chemicals for further enhancing the efficiency in collecting oil from the sea surface.

The oil boom skimmer member may include a brush skimmer arrangement. The brush skimmer arrangement may include at least one rotating brush device for collecting the oil from the water surface and for transporting the oil into the oil boom skimmer member. The brush arrangement may be an elongate brush skimmer arranged in parallel with a longitudinal axis of the oil boom skimmer member. The brush skimmer may be eccentrically positioned relative to a longitudinal center axis of the oil boom skimmer member in order to achieve a satisfactory contact with the oil on the water surface.

Figure 3:
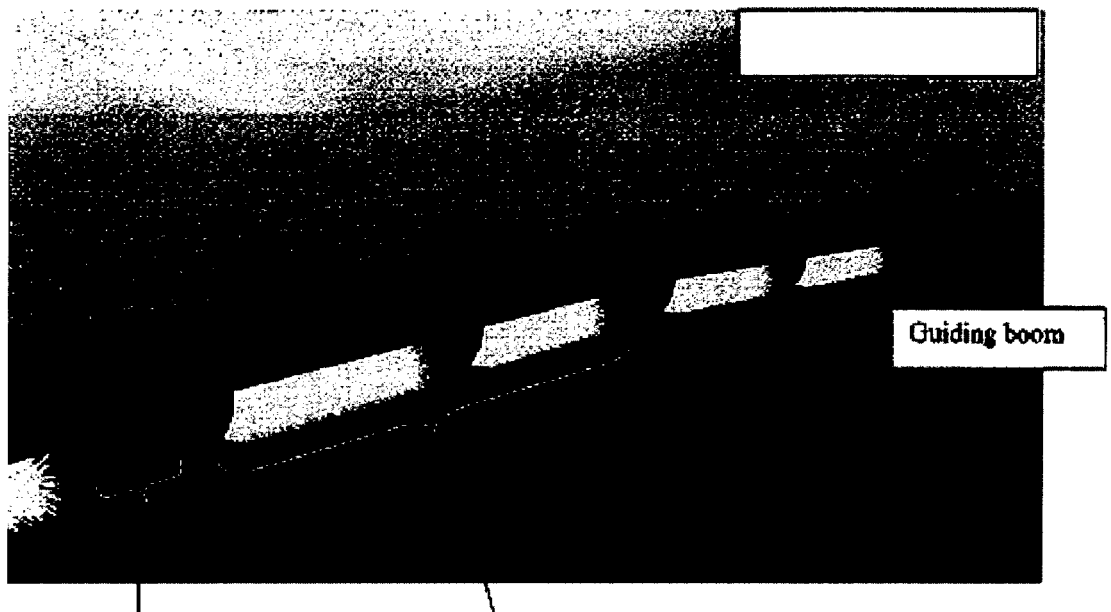
FIG. 3 shows oil boom skimmer units connected in series to form an oil boom skimmer apparatus according to an embodiment of the present invention.

FIG. 3 shows a section of the skimmer oil boom apparatus of FIG. 2 showing more clearly the outer configuration of the individual oil boom skimmer units. In the embodiment shown in FIG. 3, each oil boom skimmer unit has, integrated into the oil boom skimmer unit, two rotating brushes which act as skimmer members of the structure. Each of these brushes acts to pick up the oil from the water surface and carry it into the oil boom skimmer structure. The oil boom skimmer unit may be provided with one or more rotating brushes. The oil is collected inside the oil boom skimmer unit, and the oil may then be transported along the skimmer oil boom apparatus through a tube located inside the skimmer oil boom apparatus. The oil is transported through adjacent oil boom skimmer units inside the integrated tube and exits the skimmer oil boom apparatus to an external collecting area for the oil (not shown).

The oil boom skimmer member

Each oil boom skimmer member may include the following components: at least one brush member, at least one floating member, a hydraulic unit and a hydraulic power transmission for the brush skimmer and pump, oil scraper means (oil knife), oil collecting unit (sink), screw pump, signal cable connection, and oil return tube connection.

Figure 4:
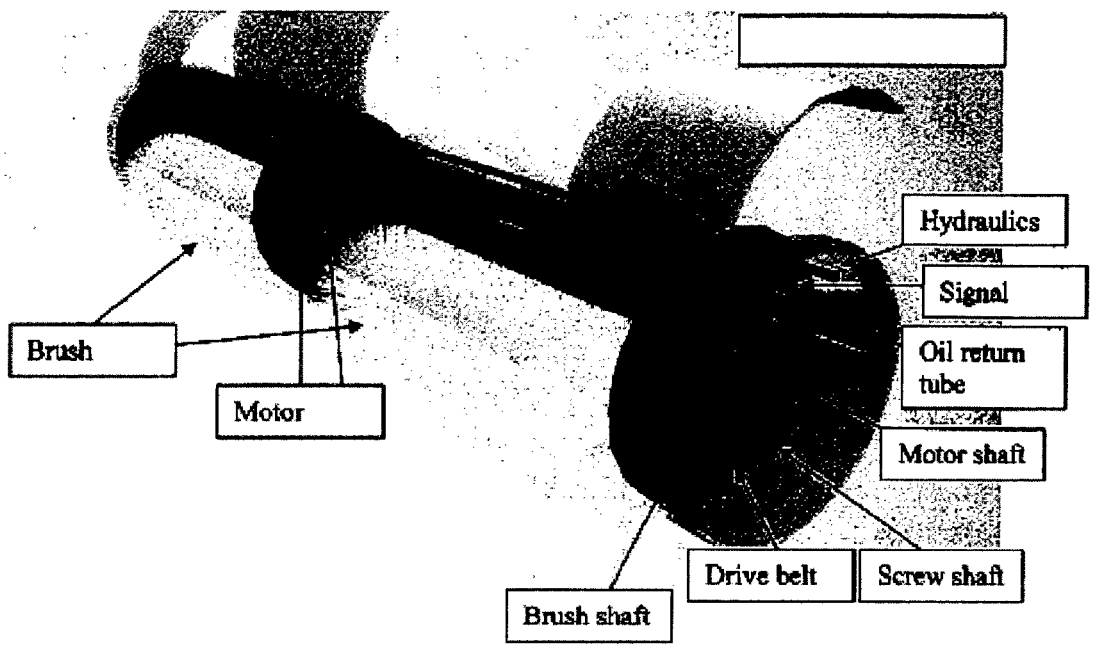
FIG. 4 shows a part of the inner structure of an oil boom skimmer unit according to an embodiment of the present invention.

FIG. 4 shows a part of the inner structure of the oil boom skimmer member according to an embodiment of the invention, but with no inner skin and outer skin. The inner and outer skins ensure the oil boom is leakproof.

In the embodiment of FIG. 4, the brush skimmer is made of two elongated rotating brushes having their shafts attached parallel to the longitudinal axis of the oil boom skimmer member and offset from a longitudinal center axis of the oil boom skimmer member. The brushes are offset so that the brushes will be located partially inside the oil boom skimmer member and partially outside of an outer skin of the oil boom skimmer member during operation of the skimmer oil boom apparatus of the invention. This means that as the brushes rotate, they will move through the oil on the water surface outside of the oil boom skimmer member and picking up oil on the sea, and then bring with it the oil into the oil boom skimmer member. The brushes may be offset, but not necessarily. The brush device may also be arranged so as to be flush with the outer skin of the oil boom. When deployed on the water surface, it will achieve sufficient contact with the oil pressed against the device for the oil to be efficiently collected by the brush skimmer. In both the embodiments described above, the brush skimmer is eccentrically positioned in the oil boom skimmer member in order to achieve a good contact with the oil on the water surface. The oil picked up by the rotating brushes is an oil and water mixture (oil emulsion).

Figure 5:
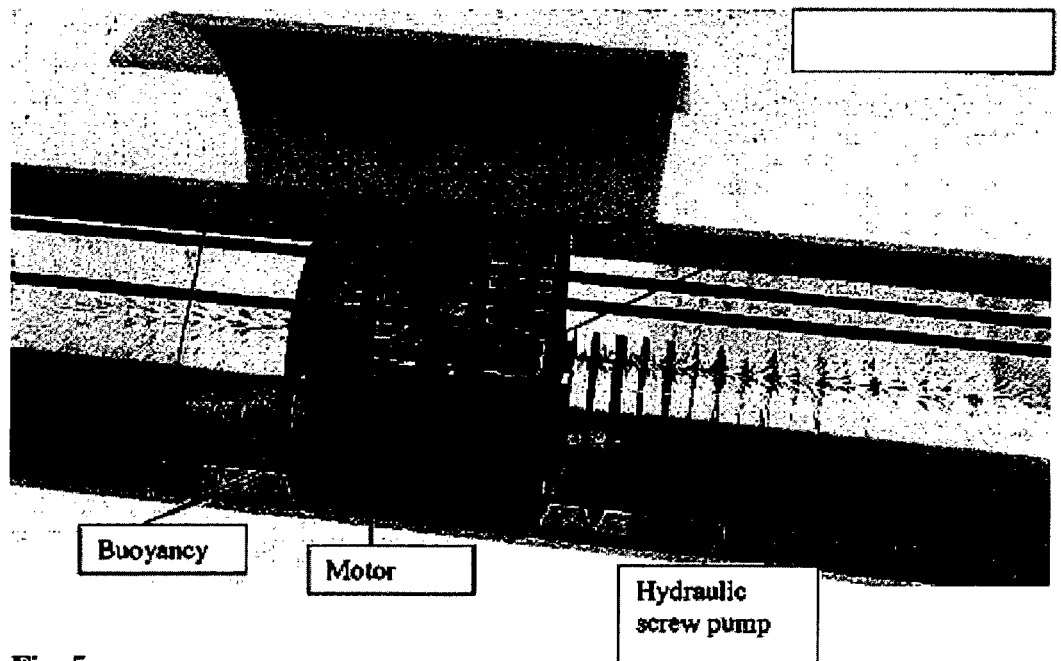
FIG. 5 shows an inner structure of an oil boom skimmer unit of an oil boom skimmer apparatus according to an embodiment of the present invention.

The brushes are attached so as to be rotatable by a motor. The motor is integrated into each individual oil boom skimmer member between the two rotating brushes. The motor may rotate the brushes by way of a shaft and transmission belt, but other driving arrangements may also be used. The motor may be hydraulically powered. A motor of an oil boom skimmer member may also rotate brushes of other adjacent oil boom skimmer members through hydraulic transmission. The motor may also control an axial screw pump via the transmission belt (FIG. 5). The motor and hydraulic transmission mechanism are disposed between the rotating brushes outside of the collecting area for the oil carried into the skimmer oil boom apparatus by the rotating brushes. In the embodiment of FIG. 4, the internal compartments, except for the inner skin, are defined by disc-shaped parallel plates provided on both sides of the brushes. These plates also serve as attachment points for the longitudinal parallel shafts for the brush, screw, and motor. The plates also have sealed bushings therethrough for the hydraulic pipe, signal cables, and oil return tube. The shapes of the plates are complementary to the inner shape of each skimmer member, and typically are substantially circular.

A screw pump is arranged in parallel with each brush on the inner side of the oil boom skimmer member, and causes transport of the oil emulsion away from the brush area. In the embodiment of FIG. 4, the screw pump extends along the entire length of the brush. The shaft of the screw pump is attached to the disc-shaped plates as indicated above. The collected oil emulsion is then transported away from the oil boom skimmer member through an oil return tube. The oil boom skimmer member also includes integrated hydraulic pipes and signal cables for controlling the motor.

Inside the oil boom skimmer unit, the oil collected by the brushes will be removed from the brushes by way of a scraper means, which may be, for example, a knife or the hydraulic screw pump. The scraped-off oil/oil emulsion then flows further down into a collection sink.

As in FIG. 4, FIG. 5 also shows the inside of the oil boom skimmer member, but from the opposite side of the positioning of the brushes so that the screw pump can be clearly seen. In FIG. 5, the longitudinal hydraulic screw pump also constitutes the brush scraper mechanism. Oil/oil emulsion is scraped off the brushes when the brushes rotate and flows down into a longitudinal oil collecting arrangement below the brushes, and is then transported away from the collecting arrangement by the rotating screw pump. The inner skin of the skimmer oil boom is indicated in the picture. Typically, the collecting arrangement of each oil boom skimmer member is bounded by the inner skin surrounding the oil boom as well as by the parallel plates provided on both sides of each brush. The oil is guided into a pump housing associated with the scraper mechanism. From the pump housing the oil is pumped into the oil return tube, which leads the collected oil via the through return tube embedded into each oil boom skimmer member and into the guiding boom and then to a collecting tank. The collecting tank may be located onboard the ship controlling the skimmer oil boom apparatus and to which the skimmer oil boom apparatus is attached. The screw pump may be powered by a separate hydraulic motor disposed inside each oil boom skimmer member. However, it is also contemplated that one motor of an oil boom skimmer member may power both the screw pump and the brush skimmer apparatus. A motor of an oil boom skimmer member may also power screw pumps of adjacent oil boom skimmer members by way of hydraulic transmission. Also in this case the motor can power the brushes through the use of a belt drive, although other driving arrangements may be used as well.

Also shown in FIG. 5 are buoyant members provided around the skimmer oil boom apparatus inside the outer skin. The buoyant members add buoyancy to the skimmer oil boom apparatus, with the buoyancy being adapted so that the brush skimmer is positioned in the surface position and able to pick up the oil from the water surface in an efficient manner.

Figure 6:
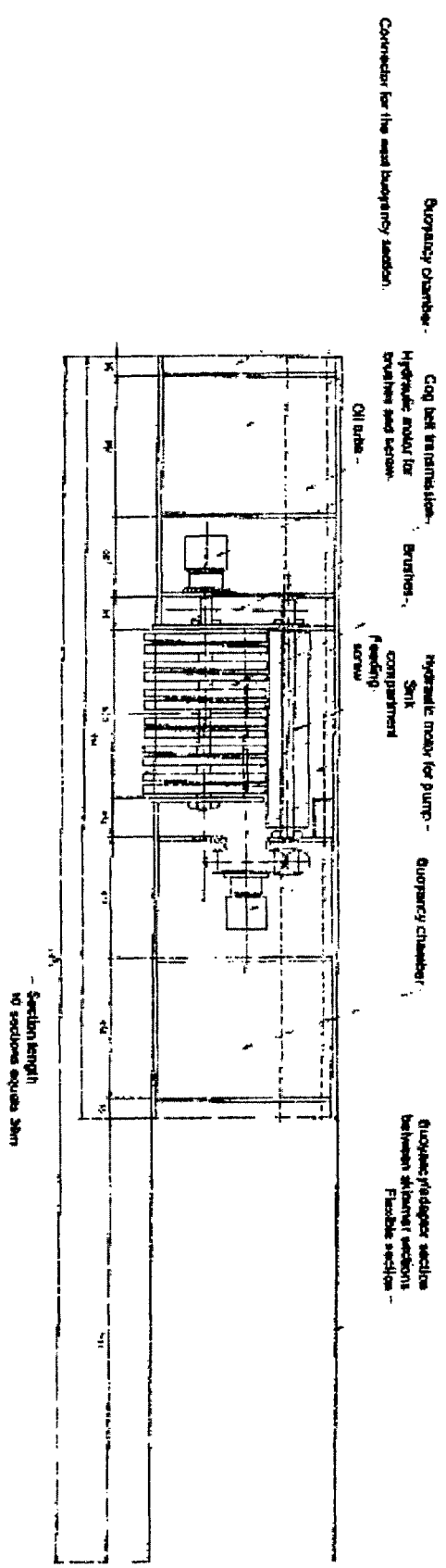
FIG. 6 shows a skimmer section/skimmer oil boom assembly in a top view, according to another embodiment of the present invention.

FIG. 6 shows a top view of another embodiment of a skimmer section of a combined oil skimmer and boom assembly according to the invention. Also in this embodiment, a longitudinal brush skimmer is disposed in parallel with the longitudinal axis of the oil boom skimmer member and offset from the longitudinal center axis of the oil boom skimmer member, so that the brush is located partially inside and partially outside of the oil boom skimmer unit. The collected oil is scraped off the brush and flows down into a sink compartment. A longitudinal feeding screw arranged in parallel with the brush conveys the oil from the sink compartment and into a pump housing in connection with the scraper mechanism. The pump then pumps the oil into an oil tube, through which the oil is transported along the oil boom skimmer unit and guiding boom to a collecting tank onboard the ship. In this embodiment, a hydraulic motor powers both the brush skimmer and screw pump via a cogged belt transmission. A separate hydraulic motor powers the pump.

The embodiment of FIG. 6 comprises a buoyancy chamber provided at each end of the skimmer section. In connection with the buoyancy chamber a connector for a further buoyancy component is provided, forming an adapter for the next skimmer section. This adapter may be flexible. The provision of a flexible adapter between each oil boom skimmer member/skimmer section ensures that the skimmer oil boom apparatus is able to move naturally in the water. In this case, the oil boom skimmer apparatus is also more easily handled by the towing vessel for maneuvering the apparatus to a desired position and shape as determined by the oil spill. The buoyancy/adapter section will also be provided with connectors and bushings for the necessary oil, hydraulic, and signal cables. The flexible adapter section and connector unit(s) described above may be constituted by the same section/unit.

Figure 7:
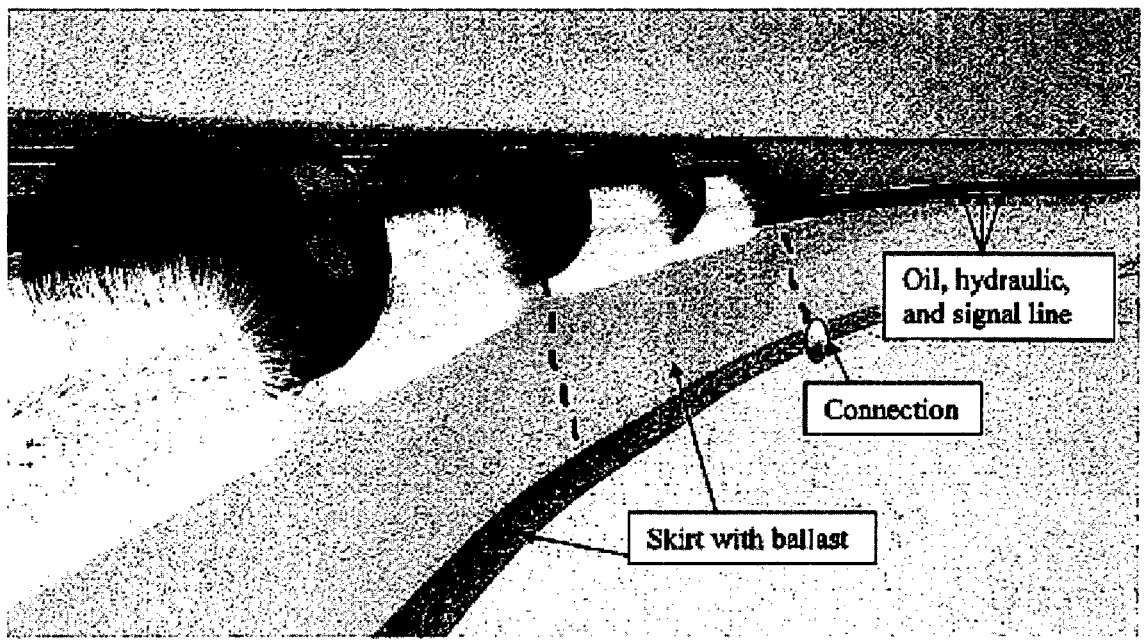
FIG. 7 shows a part of the inner structure of the oil boom skimmer apparatus and the guiding boom according to an embodiment of the present invention.

The skimmer member may also include reinforcements with quick release coupling(s) at each end attaching the oil boom skimmer member to the next oil boom skimmer member. A skirt is provided suspended underneath the oil boom skimmer member, and is connected to the skirt of an adjacent oil boom skimmer member or the guiding boom (FIG. 7).

The necessary signal cables, hydraulic pipe, and oil return tube of each individual oil boom skimmer member is connected to the corresponding cables, pipe, and tube of an adjacent oil boom skimmer member and/or to the buoyancy/adapter section by the quick release coupling, ensuring that the signal cables, hydraulic pipe, and oil return tube extend continuously throughout the entire length of the interconnected skimmer oil boom arrangement.

The hydraulic system may be operated from a console provided onboard the vessel handling the skimmer oil boom apparatus. The skimmer oil boom may also contain sensors that monitor the oil/water cut in the pump housing in order to obtain the highest efficiency possible.

Each oil boom skimmer member has a defined collecting capacity ($m^3$/hour). A number of oil boom skimmer members may be connected in series so that the overall solution achieves the desired collecting capacity. In this manner, the collecting capacity can be adapted for each individual oil spill recovery scenario. The skimmer oil boom apparatus may be made ready on the deck of the vessel by interconnecting a desired number of units.

Guiding boom

During operation of the oil spill recovery boom system, a guiding boom is connected to each of the outermost oil boom skimmer units. The guiding booms are further connected to a vessel by wireline.

In each guiding boom, buoyancy members are embedded that provide sufficient buoyancy to ensure that the oil boom is well positioned in the sea so as to be able to handle the oil. The tube for transporting the oil and water collected by the oil boom skimmer units to the collecting tank onboard the vessel also extends inside the guiding boom. Likewise for the power supply to the pumps and motors of the oil boom skimmer members.

Each guiding boom is provided with reinforcements that connect to corresponding reinforcements and quick release couplings of the outermost oil boom skimmer member. An inner skin and an outer skin make sure that the oil boom is leak proof. The guiding boom will also be provided with a skirt having ballast suspended underneath the oil boom. The ballast may be a metal chain or a wire provided with weights as needed.

FIG. 7 shows an embodiment of an inner oil boom skimmer structure (with the outer skin being removed from the oil boom skimmer units of the figure), and also shows the tubes and cables located inside the guiding boom. The tube transports the collected oil/oil emulsion to the external collecting location, which may be on board the vessel handling the oil boom. The hydraulic pipe and signal cable are arranged in parallel with the tube. The motors of the oil boom skimmer units are embedded into fluid tight boxes as an additional precaution for preventing damage caused by leakage of water and oil emulsion accumulated inside the oil boom.

The skimmer part and the other technical arrangements are built into the oil boom so that the oil boom and skimmer forms a combined unit. Each oil boom skimmer may be connected to the next oil boom skimmer and possibly to flexible adapter sections as set out above, or to the guiding boom, by way of a quick release coupling, so that the connected elements form a continuous unit integrated with the other parts of the oil boom. This quick release coupling also includes the parts of each skimmer member which are to be connected to each other, such as signal cables, hydraulic pipe, and oil tube as well as any motor drive transmissions.

It shall be noted that the embodiments described above are exemplary only, and that a person skilled in the art will be able to devise numerous other modifications and variants of the invention as it is defined in the appended patent claims.

The invention claimed is:

1. An oil boom skimmer member for oil spill recovery involving collecting oil from a water surface, wherein the oil boom skimmer member comprises a brush skimmer device integrated in a boom member, and wherein the brush skimmer device comprises at least one rotating brush device having an axis offset from a longitudinal center axis of the boom member configured to collect the oil from the water surface and transport the oil into the oil boom skimmer member.

2. The oil boom skimmer member of claim 1, wherein the brush device is an elongate brush skimmer arranged in parallel with a longitudinal axis of the oil boom skimmer member.

3. The oil boom skimmer member of claim 1, wherein the brush device is eccentrically positioned relative to a longitudinal center axis of the oil boom skimmer member.

4. The oil boom skimmer member of claim 1, and further comprising a means for removing collected oil from the brush device.

5. The oil boom skimmer member of claim 1, and further comprising a pump for pumping the collected oil through a tube in the oil boom skimmer member to an external collecting tank for the oil.

6. The oil boom skimmer member of claim 1, and further comprising at least one motor for operating the brush skimmer.

7. The oil boom skimmer member of claim 1, and further comprising at least one floating member configured in such a manner that the brush device is positioned in a surface position.

8. The oil boom skimmer member of claim 1, comprising a connector connecting the oil boom skimmer member to at least one adjacent oil boom skimmer member or to a guiding boom.

9. The oil boom skimmer member of claim 8, and further comprising at least an integrated signal cable, hydraulic pipe, and oil return tube, the connector including a quick release coupling for connecting corresponding ones of at least one signal cable, hydraulic pipe, and oil return tube of an adjacent oil boom skimmer member or guiding boom.

10. The oil boom skimmer member of claim 1, and further comprising a skirt suspended underneath the oil boom skimmer member and connectable to the skirt of an adjacent oil boom skimmer member or guiding boom.

11. An oil spill recovery boom comprising a number of oil boom skimmer members according to claim 1 connected in series and guiding booms connected to the outermost of the number of oil boom skimmer members.

12. The oil spill recovery boom of claim 11, wherein the guiding booms include a tube arranged inside the guiding booms for transporting collected oil and water to an external collecting tank.

13. The oil spill recovery boom of claim 11, wherein the guiding booms include a power supply to the oil boom skimmer members, the power supply being arranged on the inner side of the guiding booms.

14. The oil spill recovery boom of claim 11, wherein each of the guiding booms includes a connector for connection to the adjacent oil boom skimmer member.

15. The oil spill recovery boom of claim 11, and further comprising a wireline connected to each guiding boom, each wireline being attached to a towing vessel.

16. The oil spill recovery boom of claim 15, wherein the wireline includes a tube for collected oil, hydraulic pipe, power supply, and signal cable.

17. The oil spill recovery boom of claim 15, and further comprising a trawl door connected to each wireline.

18. An oil spill recovery system for collecting oil from a water surface, comprising a plurality of oil boom skimmer members according to claim 1 connected in series, a guiding boom connected to each of the outermost of the plurality of oil boom skimmer members, the guiding boom also being connected to a vessel for operating the system.

19. The oil spill recovery system of claim 18, wherein the booms are connected to the vessel via wireline and trawl doors.

* * * * *